Patented Jan. 1, 1935

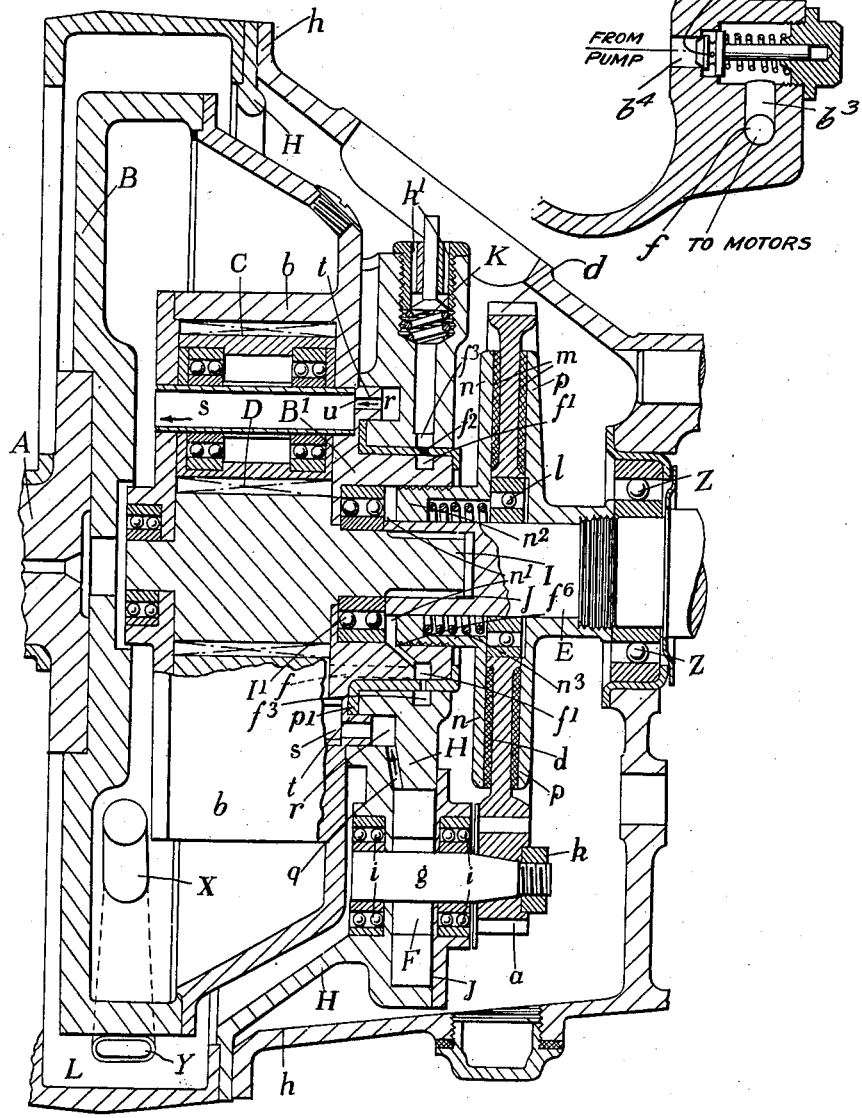

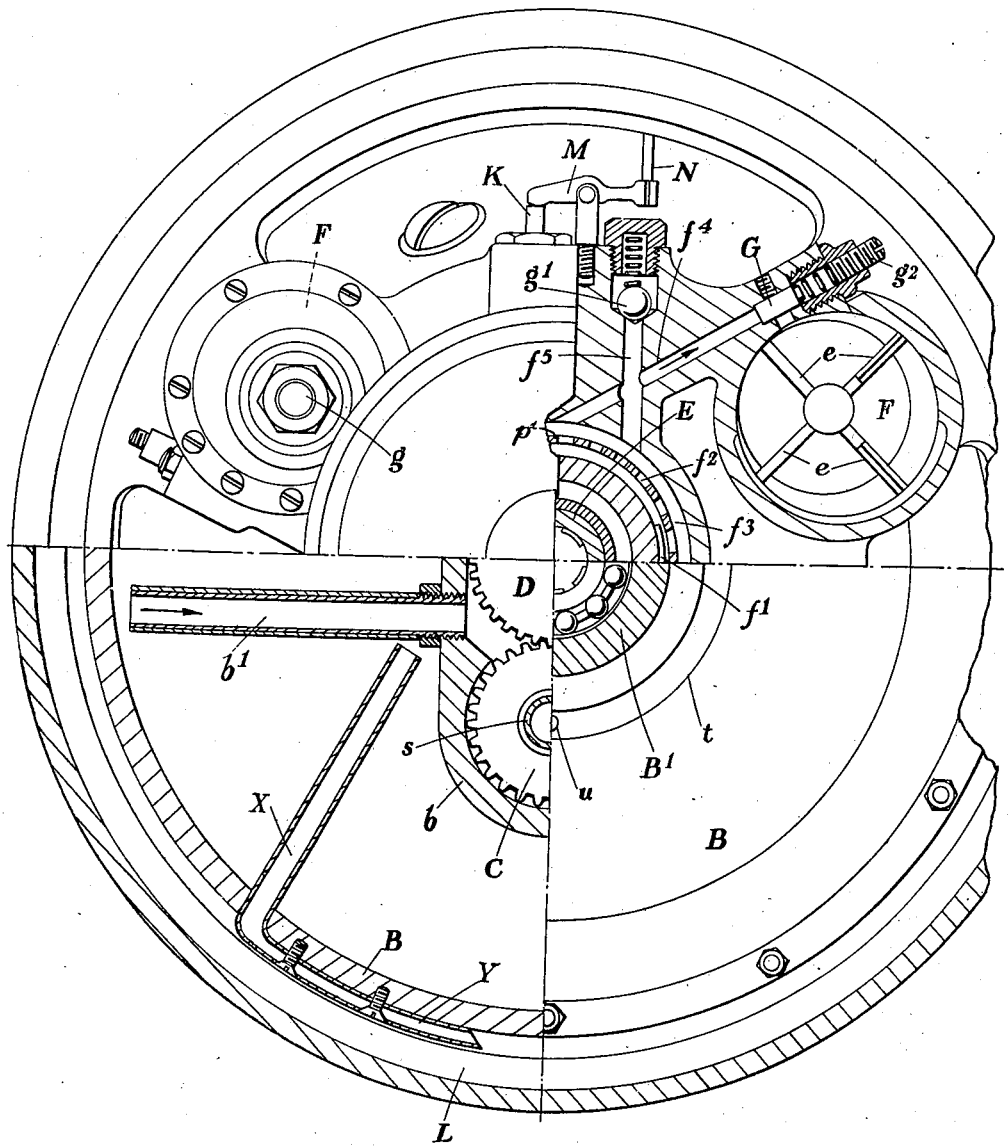

1,986,041

UNITED STATES PATENT OFFICE 1,986,041

TRANSMISSION GEARING

Howard William Bullock, Harrow, England, assignor to Bullock Auto-Gear Limited, Harrow, England Application July 23, 1931, Serial No. 552,746
In Great Britain August 1, 1930

11 Claims. (Cl. 60—53)

This invention relates to transmission gearing, and has for its object to provide an improved form of gearing of the sun and planet type in which the transmission ratio is variable and adjusts itself to the resistance to be overcome.

Transmission gearing of this type has previously been proposed in which the resistance to rotation of the planet pinions due to inertia and/or gyroscopic action is supplemented by the resistance to flow of a fluid from a pump or pumps driven from one or more of the planet pinions.

The object of the present invention is to provide a transmission gear of the type above-mentioned in which the fluid from the pump drives an engine having geared connection with the driven shaft.

Further objects are to provide such an engine with a fixed support where torque reaction may be transmitted to the driven shaft and to provide clutch means in the gearing between said engine and the driven shaft whereby said gearing need not rotate when said engine is not being driven.

With these and other objects in view the invention consists in the novel combinations and arrangements of parts set out in the claims which follow.

The improved construction is such that adequate torque reaction is provided to develop the necessary gear transmission ratio, and the preferred arrangement of parts is such that when the engine is idling the pump circuit is short-circuited and a valve accessible from the driver's seat, in the case of an automobile, is operable to put the pump into short circuit so that these parts perform the function of an hydraulic clutch.

In order to reduce the friction losses when the gear is running at normal or top gear, the supplementary drive from the pump driven gears is preferably operated through a clutch set into operation when the oil pressure in the pump circuit exceeds a certain amount so that the supplementary driven pinion can normally rotate relatively to the driven shaft.

In the accompanying drawings which illustrate the invention,

Fig. 1 is a sectional elevation of a preferred form of transmission gearing constructed in accordance with the invention.

Fig. 2 is a corresponding end view looking towards the right hand side of Fig. 1, the top portion showing, partly in section, a view with the casing and clutch removed, while the lower portion shows, partly in section, a corresponding view with the rotors and associated parts also removed.

Figure 3 is a detail view with the pump gears removed, showing the manner in which the fluid from the pump passes to the rotors.

Referring to these drawings the driving shaft A has secured thereto a hollow flywheel B which carries planet pinions C in engagement with a sun pinion D connected to the driven shaft E. The planet pinions C form a diametrically opposed pair and form with the sun pinion and a closed casing $b$ a three wheel gear pump when rotating relatively thereto. The pump causes oil to be delivered from the interior of the flywheel through a pipe $b^1$ and to pass to a series of small fluid pressure engines which are shown as of the annular chamber type, with radially-movable blades $e$ carried by rotors F.

A spring-pressed valve K in this pump circuit normally prevents the oil from returning straight back to the oil sump L through openings $k^1$, but this valve can be opened by means of a control lever M, operable through a member N from the driver's seat in the case of a motor car, so that there is then no resistance other than inertia to the rotation of the planet pinions and the driving shaft can rotate freely without transmitting any movement to the driven shaft. Operation of the valve $k$ is therefore equivalent to throwing a clutch out of gear.

The oil from the pump passes through a spring-loaded valve $b^2$ to a port $f$ and thence to an annular passage $f^1$ and thence through holes $f^2$ in a sleeve $p^1$ into an annular passage $f^3$ in a fixed frame casing H. From this passage $f^3$ a passage $f^5$ passes to a spring loaded safety valve $g^1$ which yields when excessive pressure is generated. Referring to Figure 3, the fluid emerging under pressure from the pump wheels passes into a passage $b^4$, thence through the spring-pressed valve $b^2$ to a passage $b^3$, from which it passes into the transverse passage $f$ leading to the rotors.

In passages $f^4$ leading from the passage $f^3$ to the rotors a spring-pressed valve G is provided so that the oil (or other fluid hereinafter referred to as oil) only passes to the rotors when the pressure in the pump circuits has exceeded a certain amount; an adjusting screw $g^2$ enables the opening load in this valve to be varied.

These rotors, of which there are preferably three, equiangularly spaced, are carried in the frame casing H secured to a fixed part $h$ of the vehicle or machinery framing thus providing the necessary torque reaction, and are operatively connected to pinions $a$ in engagement with a gear wheel $d$ mounted upon the driven shaft. In the preferred arrangement the gear transmission between pinions $a$ and wheel $d$ gears up in the ratio 1 to 5.

In the arrangement shown, as indicated clearly on the lower part of Fig. 1 the rotor spindles $g$ are free to rotate in the frame casings H on ball bearings $i$, and project beyond the covers $j$, the pinions $a$ being carried on the projecting portions and secured by nuts $k$.

The driven shaft E is coupled to the sun wheel D by a splined spigot I which fits a correspondingly shaped recess J in the inner end of the shaft E; the other end of the shaft E is supported in bearings Z. The pinion $d$ is capable of relative rotation to the shaft E through a bearing $l$ but is locked therewith through friction surfaces $m$ when the oil pressure is of sufficient value. Oil passes from the passage $f^1$ through an opening $f^6$ to a space $n^1$ at the rear of an extending sleeve $n^2$ carried by a disk $n$.

This sleeve $n^2$ acts as a piston working in an opening of the forward part $B^1$ of the flywheel casing which is supported on the spigot portion I of the sun pinion by a roller bearing $I^1$; the sleeve is pressed toward the left, Fig. 1, by a spring $n^3$ of sufficient strength to hold the clutch out of engagement until after the valves G have been opened to admit oil to the rotors F, and when the oil pressure is sufficient to overcome this spring, the disk $n$ carrying friction surfaces $m$ presses the wheel $d$ against an axially fixed disk $p$ carrying similar friction surfaces and thus causes the wheel $d$ to drive the shaft E.

The oil from the rotary engines F passes through openings $q$ to an annular recess $r$ formed in the frame casing H. An annular shoulder $t$ on the flywheel casing B is a running fit in this recess and has openings $u$ passing into tubes $s$ forming the planet wheel spindles; this oil is thus led directly back into the flywheel casing.

The oil which finds its way into the sump L is driven back into the hollow flywheel through a pipe X which passes through the flywheel casing B and has a forwardly directed end Y.

It is to be understood that the invention is not restricted to the exact details shown and described but embraces such modifications as come within the ambit of the accompanying claims.

I claim:—

1. A transmission gearing comprising a shaft, a planet wheel connected to said shaft, a sun wheel engaging said planet wheel, a second shaft to which said sun wheel is connected, said sun and planet wheels serving as a pump upon relative rotation, an engine driven by the fluid from said pump, a spring-loaded valve interposed between said pump and said engine and operative to by-pass pump pressure relative to the engine, gearing operated by said engine to drive said second shaft, and means controlled by a predetermined pump pressure to connect said engine-driven gearing for driving cooperation with said second shaft, said gearing being free of driving connection with said second shaft under any pump pressure less than the predetermined pressure.

2. A transmission gearing comprising a driving shaft, a hollow casing secured to said driving shaft, planet gears carried by said hollow casing, a driven shaft, a sun gear carried by the driven shaft and engaging the planet gears, said casing, planet gears and sun gear constituting a pump in the relative rotation of said sun and planet gears, an engine to be driven by the fluid pressure from the pump, a passage leading the fluid under pressure from the pump to the engine, a spring-loaded valve normally closing the passage, said valve yielding under predetermined pump pressure to establish communication between the pump and engine, and gearing between the engine and said second shaft.

3. A transmission gearing comprising a driving shaft, a hollow casing rotating with said shaft, a planet wheel carried by the hollow casing, a driven shaft, a sun wheel carried by the driven shaft and cooperating with the planet wheel, said sun wheel, planet wheel and casing constituting a pump in the relative rotation of said wheels, a frame section arranged beyond the casing and fixed against rotation, a rotary engine mounted in said section, gearing intermediate said rotary engine and said driven shaft, said frame section being formed with a passage leading to the rotary engine and open to the fluid under pressure from the pump, and means governed by pump pressure and controlling communication between said passage and the rotary engine.

4. A transmission gearing comprising a driving shaft, a hollow casing rotating with said shaft, a planet wheel carried by the hollow casing, a driven shaft, a sun wheel carried by the driven shaft and cooperating with the planet wheel, said sun wheel, planet wheel and casing constituting a pump in the relative rotation of said wheels, a frame section arranged beyond the casing and fixed against rotation, a rotary engine mounted in said section, gearing intermediate said rotary engine and said driven shaft, said frame section being formed with a passage leading to the rotary engine and open to the fluid under pressure from the pump, means governed by pump pressure and controlling communication between said passage and the rotary engine, and a manually controlled fluid by-pass leading from said passage between the pump and engine.

5. A transmission gearing comprising a driving shaft, a hollow flywheel carried by the shaft and forming a pump reservoir, a casing fixed within the flywheel, a planet wheel carried by the casing, a driven shaft, a sun wheel carried by the driven shaft, said casing, planet and sun wheels forming a pump in the relative rotation of the wheels, a frame section fixed against rotation, a rotary engine mounted in the frame section, said frame section being formed with a passage to establish fluid communication between the pump and rotary engine, said frame section being formed with an exhaust passage for the engine to return the fluid from the engine to the flywheel, fluid communication between the flywheel and pump casing, gearing intermediate the engine and the driven shaft, and a clutch element for establishing connection between said gearing and the driven shaft, said frame section being formed with a passage to utilize fluid pressure from the pump for the operation of the clutch element.

6. A transmission gearing including a driving shaft, a hollow flywheel connected thereto and serving as a pump reservoir, a casing fixed within the flywheel and serving as a pump casing, a planet wheel carried by the pump casing, a driven shaft, a sun gear carried by the driven shaft and cooperating with the planet wheel, said pump casing, planet wheel and sun gear forming a pump in the relative rotation of the wheels, a frame section fixed against rotation and concentric with an extended portion of the flywheel, an annular channel formed in the extended portion of the flywheel and open to the fluid under pressure from the pump, an annular channel formed in the frame section, means intermediate the frame section and extended portion of the flywheel to provide communication between the channels, a plurality of rotary engines carried by the frame section, the frame section being formed with passages leading from the annular channel in the frame section to the respective engines, and gearing between the engines and the driven shaft.

7. A transmission gearing including a driving shaft, a hollow flywheel connected thereto and serving as a pump reservoir, a casing fixed within the flywheel and serving as a pump casing, a planet wheel carried by the pump casing, a driven shaft, a sun wheel carried by the driven shaft and cooperating with the planet wheel, said pump casing, planet wheel and sun wheel forming a pump in the relative rotation of the wheels, a frame section fixed against rotation and concentric with an extended portion of the flywheel, an annular channel formed in the extended portion of the flywheel and open to the fluid under pressure from the pump, an annular channel formed in the frame section, means intermediate the frame section and extended portion of the flywheel to provide communication between the channels, a plurality of rotary engines carried by the frame section, the frame section being formed with passages leading from the annular channel in the frame section to the respective engines, gearing between the engines and the driven shaft, a clutch element for controlling cooperation of the gearing with the driven shaft, and a passage leading from the annular channel in the extended portion of the flywheel to direct pump fluid under pressure for operation of said clutch element.

8. A transmission gearing including a driving shaft, a hollow flywheel connected thereto and serving as a pump reservoir, a casing fixed within the flywheel and serving as a pump casing, a planet wheel carried by the pump casing, a driven shaft, a sun wheel carried by the driven shaft and cooperating with the planet wheel, said pump casing, planet wheel and sun wheel forming a pump in the relative rotation of the wheels, a frame section fixed against rotation and concentric with an extended portion of the flywheel, an annular channel formed in the extended portion of the flywheel and open to the fluid under pressure from the pump, an annular channel formed in the frame section, means intermediate the frame section and extended portions of the flywheel to provide communication between the channels, a plurality of rotary engines carried by the frame section, the frame section being formed with passages leading from the annular channel in the frame section to the respective engines, gearing between the engines and the driven shaft, and a by-pass in communication with the annular channel in the frame section for by-passing fluid under pressure from the pump relative to the rotary engines.

9. A transmission gearing including a driving shaft, a plurality of dynamically balanced planet wheels connected to said shaft, a sun wheel engaging said planet wheels a driven shaft to which the sun wheel is connected, means associated with said sun and planet wheels to cause fluid to be pumped upon relative rotation of said wheels, a plurality of rotary engines directly driven by the fluid under pressure from the pump, and gearing connecting said rotary engines and said driven shaft.

10. A transmission gearing including a shaft, a planet wheel connected to said shaft, a sun wheel engaging said planet wheel, a second shaft to which the sun wheel is connected, means associated with said sun and planet wheels to cause fluid to be pumped upon relative rotation of said wheels, an engine directly driven by the fluid under pressure from the pump, gearing between said engine and said second shaft, and a clutch controlling the cooperation of the engine-driven gearing and said second shaft, said clutch being directly operated by and responsive to the fluid pressure developed by the pump.

11. A transmission gearing comprising a shaft, a plurality of dynamically balanced planet wheels connected to said shaft, a sun wheel engaging said planet wheels, a second shaft to which the sun wheel is connected, a casing enclosing the sun and planet wheels to provide with said wheels a pump for pumping fluid upon relative rotation of said wheels, a gear on said second shaft, means controlled by pump pressure for fixing said gear relative to said second shaft, a plurality of engines driven by pump pressure and directly operating said gear, and manually adjustable means for pre-selecting that pump pressure designed to operate the engine.

HOWARD WILLIAM BULLOCK.